United States Patent
Sugishita et al.

[19]

[11] Patent Number: 6,089,012
[45] Date of Patent: Jul. 18, 2000

[54] STEAM COOLED GAS TURBINE SYSTEM

[75] Inventors: Hideaki Sugishita; Sunao Aoki; Hidetaka Mori; Kazuo Uematsu; Kazuharu Hirokawa, all of Takasago, Japan

[73] Assignee: Mitsubishi Heavy Industries, Inc., Tokyo, Japan

[21] Appl. No.: 09/031,814

[22] Filed: Feb. 27, 1998

[51] Int. Cl.[7] .............................. F02C 6/18; F02C 7/12; F02C 7/224

[52] U.S. Cl. ........................... 60/39.182; 60/730; 60/736

[58] Field of Search .............................. 60/39.182, 39.75, 60/730, 736

[56] References Cited

U.S. PATENT DOCUMENTS

| | | | |
|---|---|---|---|
| 4,424,668 | 1/1984 | Mukherjee | 60/39.182 |
| 4,932,204 | 6/1990 | Pavel er al. | 60/736 |
| 5,357,746 | 10/1994 | Myers et al. | 60/736 |
| 5,428,950 | 7/1995 | Tomlinson et al. | 60/39.182 |
| 5,826,430 | 10/1998 | Little | 60/736 |

FOREIGN PATENT DOCUMENTS

| | | |
|---|---|---|
| 0674099 A1 | 9/1995 | European Pat. Off. . |
| 0676532 A1 | 10/1995 | European Pat. Off. . |
| 0743425 A1 | 11/1996 | European Pat. Off. . |
| 0764767 A2 | 3/1997 | European Pat. Off. . |

OTHER PUBLICATIONS

Patent Abstracts of Japan, Abstract for JP 07–004210, published Jan. 10, 1995, Noguchi Yoshiki.
Patent Abstracts of Japan—Abstract for JP 06–323162 A, published Nov. 22, 1994; Nakamura Shozo.

*Primary Examiner*—Louis J. Casaregola

[57] ABSTRACT

A steam cooled gas turbine system in a combined power plant, constituted such that gas turbine blade cooling steam and combustor tail pipe cooling steam are bled from an outlet of a high pressure turbine, passed through a fuel heater for heat exchange with fuel, sprayed with water to be cooled to predetermined temperatures, and then supplied to cooling areas, whereby the cooling steam supply temperatures can be maintained at predetermined values during partial load operation as well as rated operating to achieve effective cooling.

2 Claims, 2 Drawing Sheets

STEAM COOLED GAS TURBINE SYSTEM

BACKGROUND OF THE INVENTION

This invention relates to a gas turbine system in which a gas turbine blade and a combustor tail pipe are steam cooled.

A conventional gas turbine system is described with reference to FIG. 2. As shown in FIG. 2, a conventional steam cooled gas turbine is configured such that bleed steam from an outlet of a high pressure turbine is used as such for blade cooling, and then recovered by an intermediate pressure turbine. A tail pipe of a combustor is cooled with discharge air from a compressor.

In FIG. 2, the numeral 01 denotes a gas turbine, 02 an exhaust heat recovery boiler, 7 a high pressure turbine, 8 an intermediate pressure turbine, and 9 a low pressure turbine. In the gas turbine 01, the air is sucked into a compressor 5, and compressed there to a predetermined pressure. Then, fuel adjusted to a predetermined temperature at an inlet of a turbine 4 and air pressurized by the compressor 5 are mixed and burnt in a combustor 6.

In the turbine 4, a high temperature, high pressure combustion gas generated by the combustor 6 is expanded to produce output, which generates power in a generator 20. Exhaust gas after completion of work is supplied to the exhaust heat recovery boiler 02 through an exhaust gas duct 10.

A turbine stationary blade and a turbine moving blade of the turbine 4 are cooled with steam fed from an outlet of the high pressure turbine 7 through a blade cooling steam supply piping 11. Heated steam after cooling is recovered into an inlet of the intermediate pressure turbine 8 via a blade cooling steam recovery piping 12.

In the exhaust heat recovery boiler 02, superheated steam produced by a high pressure drum 3 is guided to the high pressure turbine 7 through a high pressure steam piping 13. Then, it is expanded in the high pressure turbine 7 to generate output.

Output steam from the high pressure turbine 7 is branched into a portion which is guided to the turbine stationary blade and moving blade of the gas turbine 01 by the blade cooling steam supply piping 11, and a portion which is guided to a reheater 24 of the exhaust heat recovery boiler 02.

Steam produced by an intermediate pressure drum 2 is mixed with outlet steam from the high pressure turbine 7. The resulting mixture is supplied to the reheater 24, where it is heated. The heated mixture is mixed with the blade cooling steam guided by the blade cooling steam recovery piping 12, and is then fed to the inlet of the intermediate pressure turbine 8.

In the intermediate pressure turbine 8, steam expands to obtain output. Outlet steam from the intermediate pressure turbine 8 mixes with steam, which has been produced by a low pressure boiler 1, via a low pressure steam piping 15. Then, the mixed steam is supplied to the low pressure turbine 9 to obtain output.

Then, steam is condensed by a condenser 21, and pressurized by a pressure pump 22 to a predetermined pressure. Then, the condensate is fed to the exhaust heat recovery boiler 02 through a feed water piping 23.

As stated earlier, according to the conventional steam cooled gas turbine, steam bled from the outlet of the high pressure turbine is used as blade cooling steam, while air discharged from the compressor is used as such to cool the tail pipe of the combustor. Thus, temperature control for cooling steam has been difficult.

Furthermore, the high temperature part of the gas turbine undergoes creep deformation, unless the metal temperature is made lower than a certain temperature. Thus, the supply temperature of cooling steam must be set to be below a certain limit. Under partial load, in particular, the cooling steam supply temperature tends to become higher than under rated load. Utmost care must be exercised about this respect.

SUMMARY OF THE INVENTION

The present invention has been accomplished in the light of these situations. Its object is to provide a system which can maintain the cooling steam supply temperature at a predetermined value under partial load as well as rated load, thereby performing effective cooling.

The present invention for attaining this object provides a steam cooled gas turbine system in a combined power plant which comprises a combination of a gas turbine plant and a steam turbine plant, and includes an exhaust heat recovery boiler for generating steam turbine driving steam by utilizing exhaust heat from a gas turbine; wherein gas turbine blade cooling steam and combustor tail pipe cooling steam bled from an outlet of a high pressure turbine are passed through a fuel heater for heat exchange with fuel; then each cooling steam is sprayed with water to be cooled to a predetermined temperature, and is supplied to a cooling area; and the blade cooling steam that has left the cooling area is recovered into an intermediate area of a reheater, while the tail pipe cooling steam that has left the cooling area is recovered into an inlet of an intermediate pressure turbine. According to this gas turbine system, blade cooling steam and combustor tail pipe cooling steam are bled from the outlet of the high pressure turbine, heat-exchanged with fuel by the fuel heater of the gas turbine, and then sprayed with feed water to be cooled to the predetermined temperature, whereby the metal temperature of the combustor tail pipe and turbine blade can be brought down to a level below the allowable temperature.

During this process, gas turbine fuel is heated by the fuel heater as stated previously, so that the fuel flow rate can be decreased to increase the efficiency of the combined plant.

DETAILED DESCRIPTION OF THE PREFERRED EMBODIMENTS

Figure 1:
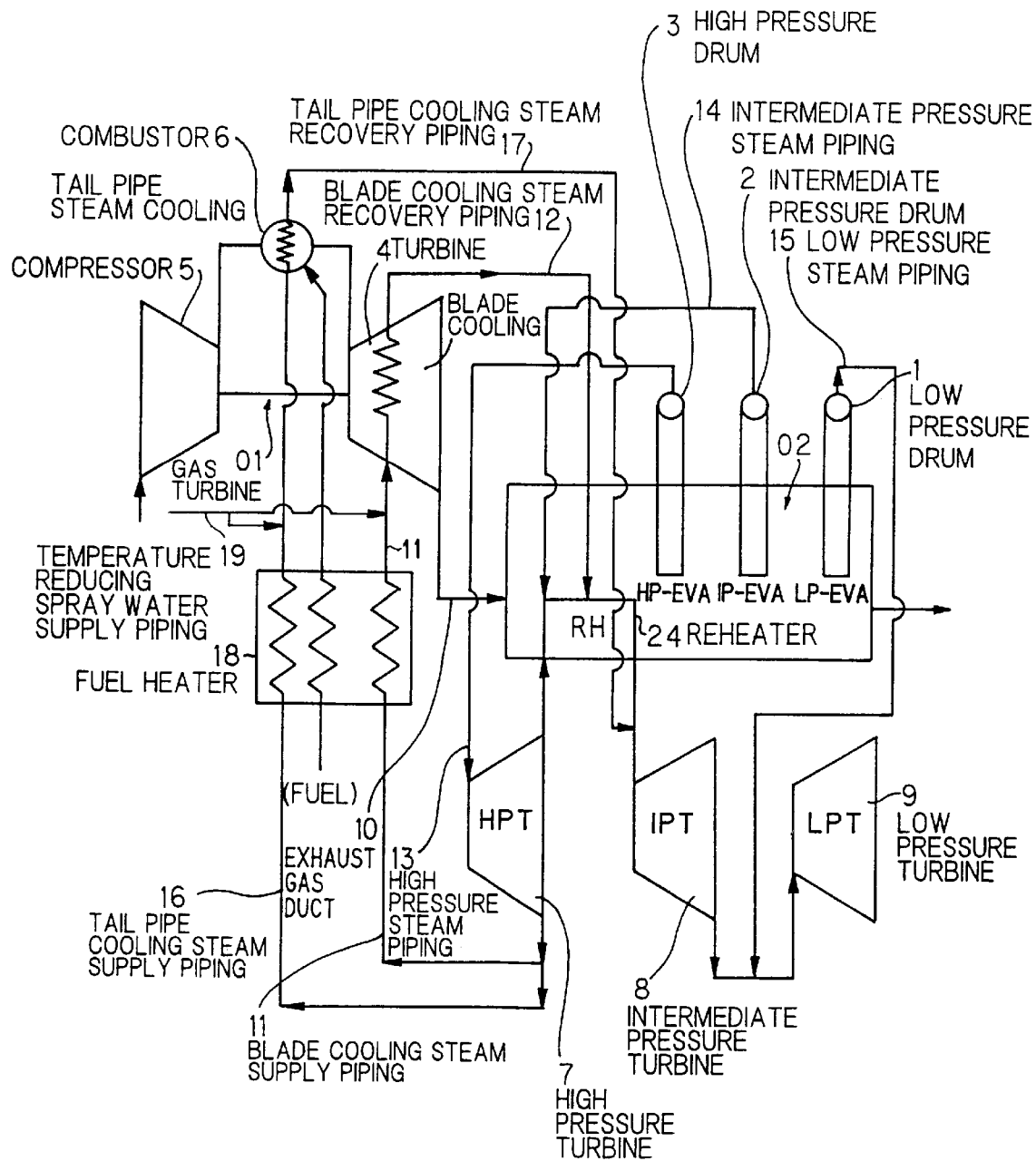
FIG. 1 is a system diagram of a steam cooled gas turbine system concerned with an embodiment of the present invention.
Figure 2:
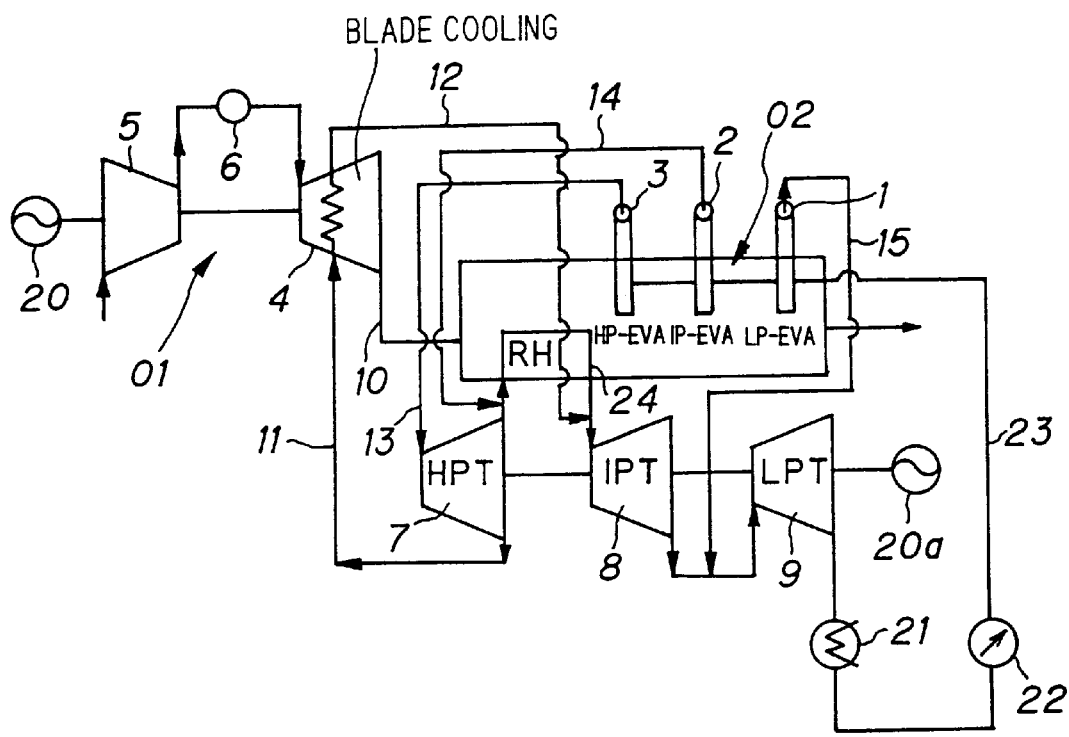
FIG. 2 is a system diagram of a conventional steam cooled gas turbine system.

An embodiment of the present invention will now be described with reference to FIG. 1. The same parts as in the conventional system are assigned the same numerals and symbols, and an overlapping explanation is omitted, with the main focus put on the key points of this embodiment.

In the instant embodiment, high pressure bleed steam discharged from an outlet of a high pressure turbine 7 is passed through a fuel heater 18 by way of a blade cooling steam supply piping 11 and a tailpipe cooling steam supply piping 16 so as to exchange heat with fuel in a gas turbine. Then, water is fed from a temperature reducing spray water supply piping 19 to each of the blade cooling steam supply piping 11 and the tail pipe cooling steam supply piping 16. A control device (not shown) adjusts the amount of heating of the gas turbine fuel and the flow rate of the spray water for the temperature reducing spray water supply piping 19. Thus, the supply temperature of cooling steam can be controlled at and adjusted to a predetermined temperature during rated operation and partial load operation of the gas turbine 01.

In the conventional steam cooled gas turbine system, as aforementioned, cooling steam for the turbine stationary blade and moving blade of the gas turbine is part of bleed steam from the outlet of the high pressure turbine 7. When the inlet temperature of the gas turbine, the inlet guide vane opening, or the atmospheric temperature changes, therefore, the outlet temperature of the high pressure turbine 7 changes accordingly. Thus, the turbine blade cooling steam temperature also changes, thereby simultaneously changing the metal temperature of the turbine blade. Under partial load, in particular, this cooling steam temperature markedly tends to become high, posing a possibility for creep deformation of the turbine blade. In the instant embodiment, on the other hand, the cooling steam supply temperature can be controlled to a predetermined temperature during the rated operation and partial load operation of the gas turbine. Thus, the reliability of the stationary blade and moving blade of the turbine 4 can be ensured, and an improvement in the combined efficiency by fuel heating can be expected.

According to the present invention, as described above, gas turbine blade cooling steam and combustor tail pipe cooling steam are taken from bleed air from the high pressure turbine, heat-exchanged in the gas turbine fuel heater, and then sprayed with water, whereby the supply temperatures of the combustor tail pipe cooling steam and the gas turbine blade cooling steam can be set at predetermined temperatures under any operating conditions. Thus, the metal temperatures of the combustor tail pipe and the turbine blade of the gas turbine can be controlled within the allowable temperature range.

Furthermore, fuel is heated by heat exchange with cooling steam, so that the combined efficiency can be raised.

While the present invention has been described with reference to the illustrated embodiment, it is to be understood that the invention is not restricted thereby, but various changes and modifications may be made in the concrete structure of the invention without departing from the spirit and scope of the invention.

What is claimed is:

1. A steam cooled gas turbine system in a combined power plant which comprises a combination of a gas turbine plant and a steam turbine plant, and an exhaust heat recover boiler for generating steam turbine driving steam by utilizing exhaust heat from a gas turbine, the improvement comprising:

conduits for supplying a gas turbine blade cooling steam and combustion exhaust cooling steam bled from an outlet of steam turbine to a fuel heater for heat exchange with fuel;

a source of water mixable with the respective cooling steams for controlling the temperature of the cooling streams;

a controller for supplying the temperature controlled cooling steams to a cooling portion for cooling blades of the gas turbine; and the blade cooling steam that has left the cooling portion being recovered into an intermediate area of a reheater, while the exhaust cooling steam that has left the cooling portion is recovered into a inlet of the steam turbine.

2. A steam cooled gas turbine system in a combined power plant which comprises a combination of a gas turbine plant and a steam turbine plant, and an exhaust heat recovery boiler for generating steam turbine driving steam by utilizing exhaust heat from a gas turbine, the improvement comprising:

conduits for supplying a gas turbine blade cooling steam and combustion exhaust cooling steam bled from an outlet of a high pressure steam turbine to a fuel heater for heat exchange with fuel;

a source of water sprayable on the respective cooling steams for controlling the temperature of the cooling streams passing through the fuel heater;

a controller for supplying the temperature controlled cooling steams to a cooling portion for cooling blades of the gas turbine; and the blade cooling steam that has left the cooling portion being recovered into an intermediate area of a reheater, while the exhaust cooling steam that has left the cooling portion is recovered into a inlet of an intermediate pressure the steam turbine.

* * * * *

UNITED STATES PATENT AND TRADEMARK OFFICE
CERTIFICATE OF CORRECTION

PATENT NO. : 6,089,012
DATED : July 18, 2000
INVENTOR(S) : Hideaki Sugishita et al.

It is certified that error appears in the above-identified patent and that said Letters Patent is hereby corrected as shown below:

<u>Column 4,</u>
Line 3, change "recover" to -- recovery --.
Line 6, delete "the improvement".
Line 8, before "conduits" insert -- first and second --; after "for" insert -- respectively --; and delete "a".
Line 9, after "exhaust" insert -- gas --.
Line 10, after "of" insert -- a first --.
Line 12, before "a source" insert -- a conduit for supplying --; before "water" insert -- temperature reducing --; change "mixable with the respective" to -- spray to both said --.
Line 14, change "streams" to -- steams in the first and second conduits; --
Line 15, delete "a controller for" and insert therefor -- the first conduit thereafter --.
Line 16, after "steams" insert -- therein --; change "a cooling portion" to -- cooling apparatus --.
Line 17, after "turbine" insert --, the second conduit thereafter supplying the temperature controlled cooling steam therein to apparatus providing steam cooling of combustion exhaust gas of the gas turbine; and delete "and".
Line 18, change "the" (first occurrence) to -- a steam recovery conduit for feeding --; and replace "that has left the cooling portion being recovered into" with -- from the apparatus for cooling blades to --;
Line 19, change "reheater," to -- reheater; and
a steam recovery conduit for feeding combustion exhaust gas cooling steam from the apparatus providing steam cooling of combustion exhaust gas of the gas turbine to an inlet of a second turbine. --.
Line 20, delete "while the exhaust cooling steam that has left the cooling portion is recovered into a inlet of the steam turbine".
Line 29, before "conduits" insert -- a pair of --; after "for" insert -- repsectively --; and delete "a" after "supplying".
Line 32, after "with" insert -- gas turbine --.
Line 33, delete "a source of" and insert -- means for supplying --.
Line 34, after "steams" insert -- in said pair of conduits --.
Line 35, change "streams" to -- steams --; change "through" to -- out of --.
Line 36, change "a controller for" to -- said pair of conduits thereafter respectively --.
Line 37, after "steams" insert -- therein --.

UNITED STATES PATENT AND TRADEMARK OFFICE
CERTIFICATE OF CORRECTION

PATENT NO. : 6,089,012
DATED : July 18, 2000
INVENTOR(S) : Hideaki Sugishita et al.

It is certified that error appears in the above-identified patent and that said Letters Patent is hereby corrected as shown below:

Column 4,
Line 38, change "turbine:" to -- turbine and to a cooling portion for cooling combustion exhaust gas of the gas turbine; --.
Line 41, before "being" insert -- for cooling blades --; before "into" insert -- by a conduit --.
Line 42, delete "while".
Line 43, after "portion" insert -- for cooling combustion exhaust gas --; before "into" insert -- by a conduit --.
Line 44, delete "the".

Signed and Sealed this

Twenty-fifth Day of December, 2001

Attest:

JAMES E. ROGAN
Attesting Officer    Director of the United States Patent and Trademark Office